United States Patent [19]

Izumi et al.

[11] Patent Number: 5,428,594

[45] Date of Patent: Jun. 27, 1995

[54] MAGNETO-OPTIC RECORDING METHOD AND APPARATUS UTILIZING A TWO-STATE MODULATED LIGHT BEAM

[75] Inventors: Haruhiko Izumi; Masaharu Moritsugu; Masakazu Taguchi, all of Kawasaki, Japan

[73] Assignee: Fujitsu Limited, Kawasaki, Japan

[21] Appl. No.: 104,045

[22] PCT Filed: Dec. 25, 1992

[86] PCT No.: PCT/JP92/01701

§ 371 Date: Aug. 18, 1993

§ 102(e) Date: Aug. 18, 1993

[87] PCT Pub. No.: WO93/13523

PCT Pub. Date: Jul. 8, 1993

[30] Foreign Application Priority Data

Dec. 27, 1991 [JP] Japan ................. 3-347302

[51] Int. Cl.$^6$ .............................. G11B 11/10
[52] U.S. Cl. ...................... 369/99; 369/13; 369/107; 369/116
[58] Field of Search ............ 369/13, 99, 275.2, 116, 369/107, 275.1, 275.3; 360/59, 114

[56] References Cited

U.S. PATENT DOCUMENTS

| | | | |
|---|---|---|---|
| 5,087,532 | 2/1992 | Challener, IV | 369/13 |
| 5,163,031 | 11/1992 | Osato | 369/13 |
| 5,233,578 | 8/1993 | Yamamoto et al. | 369/13 |
| 5,263,015 | 11/1993 | Niihara et al. | 369/100 |
| 5,282,095 | 1/1994 | Spruit et al. | 369/13 |

*Primary Examiner*—Georgia Y. Epps
*Assistant Examiner*—Kim-Kwok Chu
*Attorney, Agent, or Firm*—Nikaido, Marmelstein, Murray & Oram

[57] ABSTRACT

A magneto-optic recording method and a magneto-optic recording apparatus in which a magneto-optic overwritable medium having two layers, which layers have different coercive force—temperature characteristics and are coupled by exchange interaction, is heated by applying a light beam while an external magnetic field is being applied to the medium and in which data coded to invariably have FALSE states between two TRUE states is turned into a light beam having dual power levels and recorded on the medium, the magneto-optic recording method including the steps of: forming record marks by heating the magneto-optic overwritable medium to a high temperature by means of a high light beam power associated with a FALSE state in the write data; and of heating the magneto-optic overwritable medium to a low temperature by means of a low light beam power associated with a TRUE state in the write data.

11 Claims, 16 Drawing Sheets

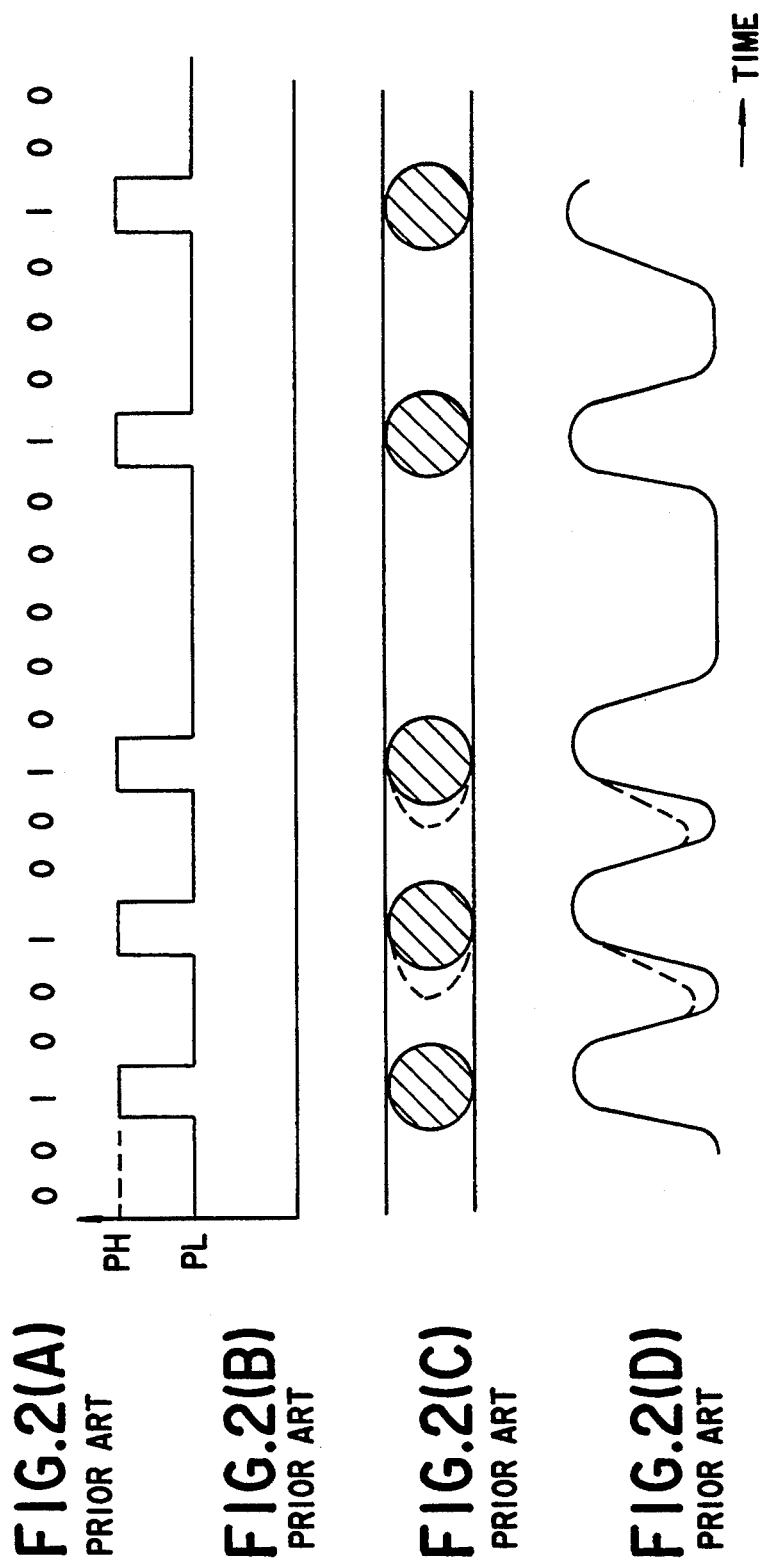

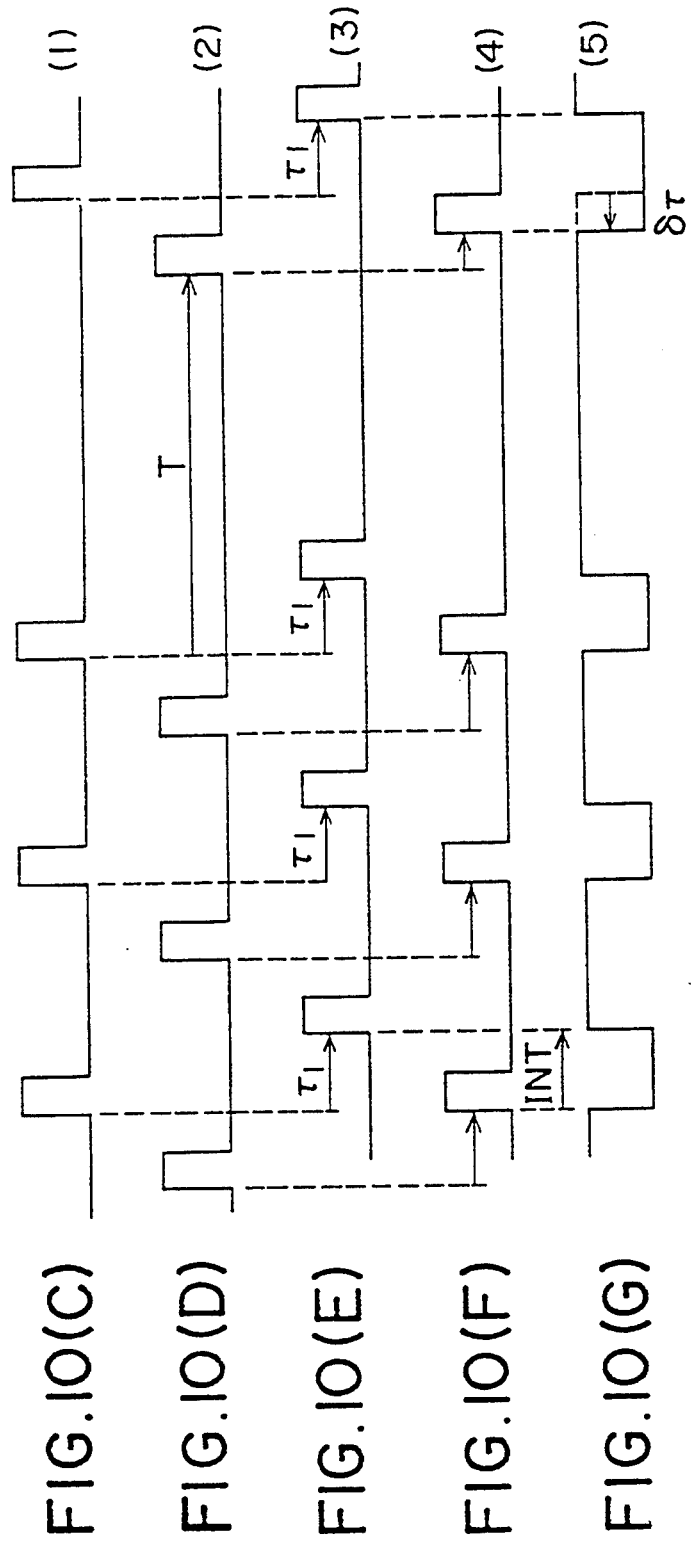

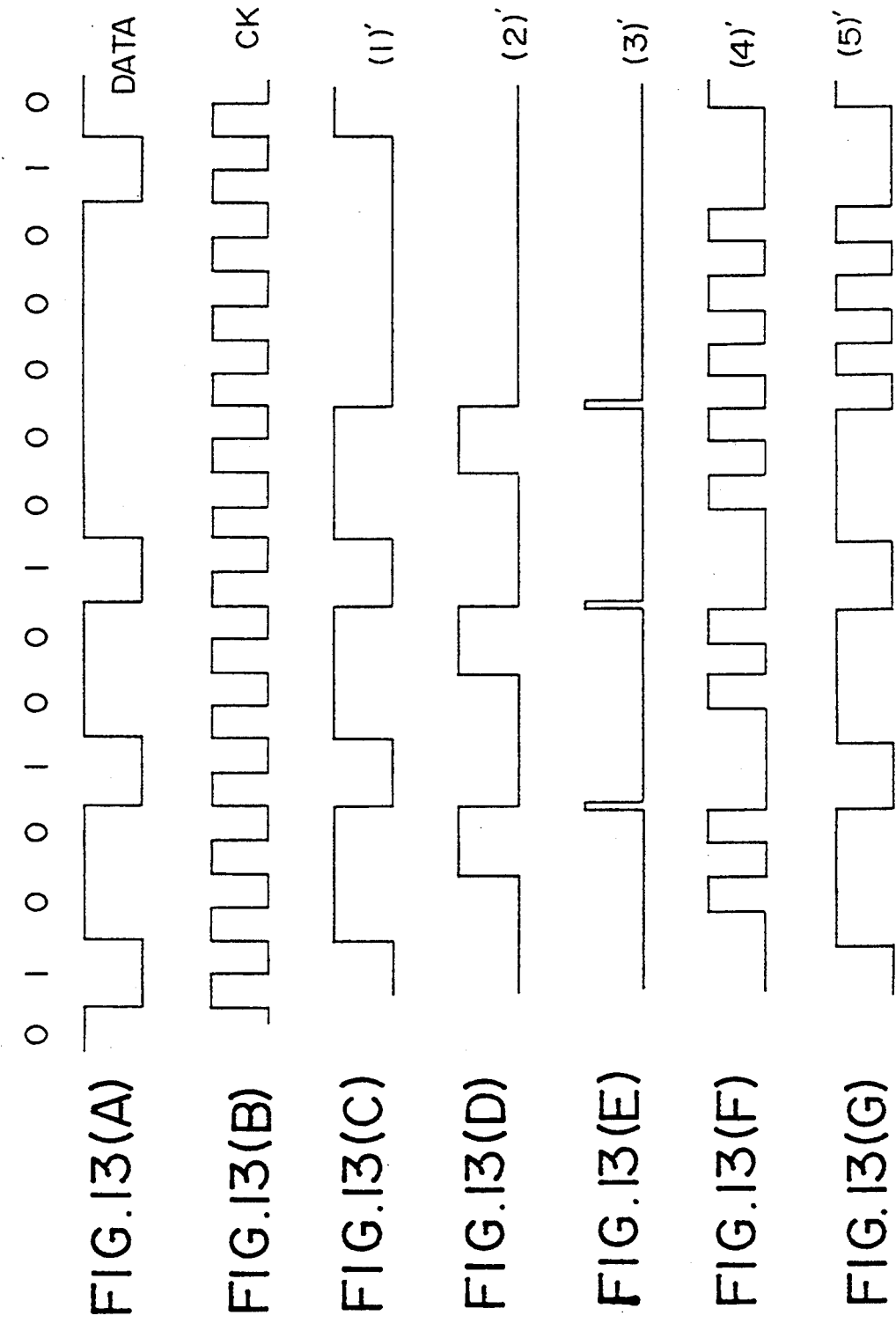

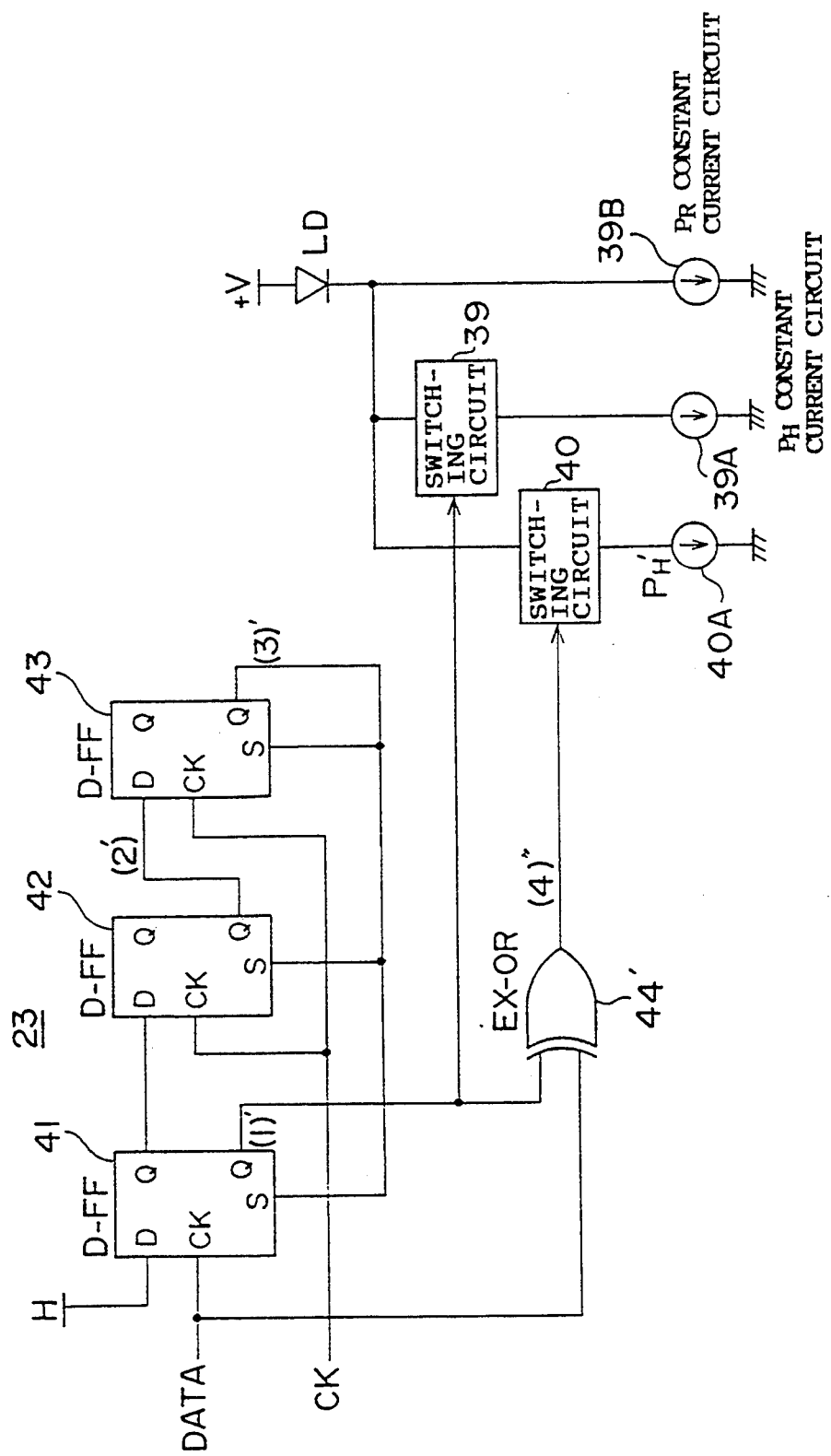

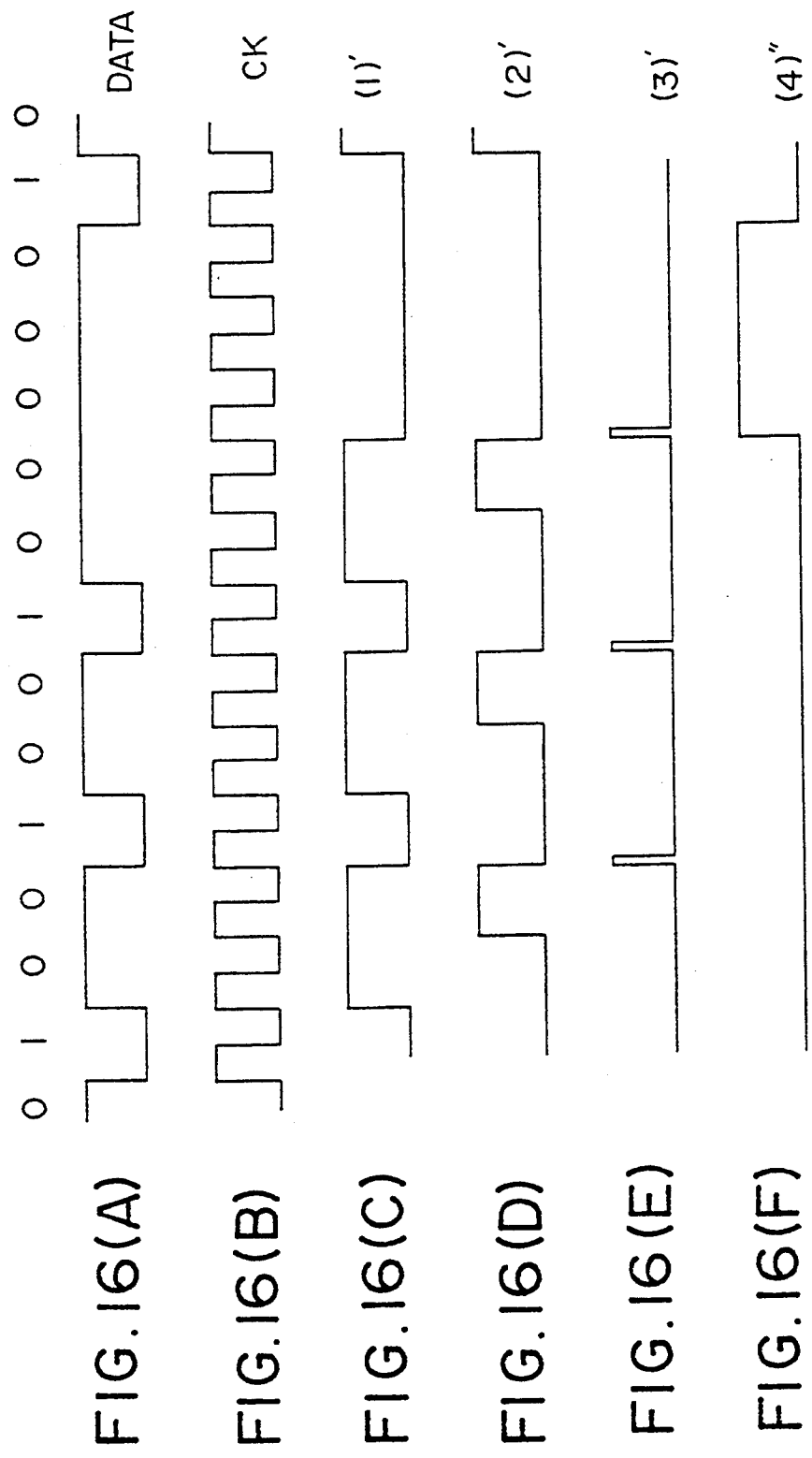

MAGNETO-OPTIC RECORDING METHOD AND APPARATUS UTILIZING A TWO-STATE MODULATED LIGHT BEAM

FIELD OF THE INVENTION

The present invention relates to a magneto-optic recording and more particularly to a magneto-optic recording method in which information is recorded in a magneto-optic overwritable recording medium.

BACKGROUND ART

FIGS. 1(A) and 1(B) show the principle of a magneto-optic recording method in which a magneto-optic overwritable recording medium is used. Referring to FIG. 1(A), a magneto-optic overwritable medium 10 is configured such that a magnetic layer embodying a memory layer 12 is formed on the main surface of a disc-shaped substrate 11 made of a glass or a polycarbonate, and such that a magnetic layer embodying a recording layer 13 is formed on the memory layer 12, the memory layer 12 and the recording layer 13 being coupled by exchange interaction. While the overwritable medium 10 is made to rotate at several thousand rpm, a laser light beam is applied to the medium through the substrate 11 thereof. A bias magnet 15 is provided opposite a part of the recording layer 13 to which part the laser light beam is applied. An initializing magnet 16 is provided in front of the bias magnet 15 so that the two magnets are separated at a distance along the circumferential direction of the medium. The bias magnet 15 and the initializing magnet 16 face the recording layer 13 in opposite directions in terms of polarity.

Temperature—coercive force characteristics of the memory layer 12 and of the recording layer 13 are as indicated by $L_{12}$ and $L_{13}$ of FIG. 1(B), respectively. A Curie point. $TC_R$ of the recording layer 13 is prescribed to be higher than a Curie point $TC_M$ of the memory layer 12. A broken line indicates the intensity of the bias magnetic field of the bias magnet 15, and an alternate long and short dash line indicates the intensity of the initial magnetic field of the initializing magnet 16.

In such a magnetic medium 10, the recording layer 13 is magnetized, at a room temperature, in a direction specified by the initializing magnet 16. Accordingly, information recorded in the recording layer 13 as variations in magnetization is erased by means of the magnet 16. When a laser light beam 14 having a large power ($P_H$) is applied to the memory layer 12 so as to heat it beyond a temperature TH, a subsequent cooling process ensures that the directions of magnetization of the recording layer 13 and the memory layer 12 are aligned with the magnetization direction of the bias magnet 15, so that record marks are formed. When the power of the applied laser light beam 14 is low ($P_L$), and the memory layer 12 is heated to a temperature within a range between TL and TH, the recording layer 13 is not magnetized by the bias magnet 15, and the magnetization direction of the memory layer 12 is aligned with the magnetization direction of the recording layer 13 (the magnetization direction of the initial magnetizing magnet), due to exchange interaction. In such an information recording process, an overwrite process not involving an erasing process can be carried out on the magneto-optic overwritable medium 10.

In a magneto-optic recording process, information modulated through (2, 7) RLL coding (run length limited coding) is generally recorded, an example of how this modulation is effected being shown in FIG. 2(A). In (2, 7) RLL coding, it is stipulated that two channel bits "1" be separated by a sequence of between two and seven channel bits "0". That is, the conventional recording is performed such that the light beam power $P_H$ is used, as shown in FIG. 2(B), to correspond to a state "1" of recorded data shown in FIG. 2(A) and such that light beam power $P_L$ is used to correspond to "0". This way, a pit position recording can be effected in which record marks as shown in FIG. 2(C) are formed. A restored waveform as shown in FIG. 2(D) is obtained when the information is read. Referring to FIG. 2(C), hatched areas indicate record marks where there are reversions in magnetization direction. With such a (2, 7) RLL coding, there is no fear of synchronization being lost during a read operation, since record marks are formed at a maximum of every seventh pit however long a sequence of the same logical value is in the recorded data. At the time of reading the data, a light beam power $P_R$ smaller than the above $P_L$ is used.

The recording of the magneto-optic overwritable medium is effected on the basis of the heating of the medium by means of the laser light beam. When a 1.5 pattern, corresponding to the recorded data "1001" where the marks are closest to each other, is performed, a large amount of heat used for recording the marks is transferred to non-record areas between the marks. Hence, there may arise a case where the marks are very close to each other, as indicated by broken lines in FIG. 2(C) and 2(D), or a case where they overlap each other. $\tau$ indicates a length of an information bit cell before being subjected to (2, 7) RLL code modulation. Solid lines in FIG. 3 indicate a restored signal carrier—noise ratio (CN ratio) obtained as the light beam powers $P_L$ and $P_H$ used at the time of recording the above $1.5\tau$ pattern are varied. In this pattern, the CN ratio is at a maximum level when the light beam power $P_L$ is small. Contrastingly, when a $4\tau$ pattern, corresponding to the recorded data "100000001" where the marks are widest apart from each other, is recorded, a non-mark area extends over a large length, and the heat that produced a mark exercises relatively small influence on the mark adjacent to it. Hence, the CN ratio of the restored signal is as indicated by broken lines in FIG. 3. It is found that a large light beam power $P_L$ is required to obtain a sufficient-CN ratio for a given light beam power $P_H$. $P_R$ indicates a light beam power used in a read mode. In this way, the conventional overwrite magneto-optic recording method has a disadvantage in that the optimal light beam power, particularly the light beam power $P_L$, for maximizing the CN ratio depends on the recorded data pattern, and in that, consequently, an optimal combination of the light beam powers $P_L$ and $P_H$ capable of restoring the data at a high CN ratio, irrespective of the recorded data pattern, cannot be determined.

DISCLOSURE OF THE INVENTION

The present invention has been developed in view of the above-mentioned disadvantage, and its object is to provide a magneto-optic recording method by which data can be recorded properly so as to be restored without a degradation in CN ratio, irrespective of the recorded data pattern.

Another and more specific object of the present invention is to provide a magneto-optic recording method wherein information is recorded on a magneto-optic recording medium comprising: a first magnetic film having a first coercive force—temperature characteristic characterized by a first Curie point; a second magnetic film coupled by exchange interaction with the first magnetic film and having a second coercive force—temperature characteristic characterized by a second Curie point lower than the first Curie point, the magneto-optic recording method comprising the steps of:

aligning, by applying a first external magnetic field having a first direction and adjusted to a magnitude controlled to be large enough to align magnetization direction of the first magnetic film with the first direction at a room temperature but not large enough to align magnetization direction of the second magnetic film with the first direction at a room temperature, magnetization direction of the first magnetic film with the first direction;

applying, after the step of applying the first external magnetic field, a second magnetic field in a second direction opposed to the first direction at a second magnitude controlled such that the first magnetic film is magnetized in the second direction at a first temperature and such that the second magnetic film is magnetized in the second direction at a second temperature lower than the first temperature; and directing, at the same time as the step of applying the second magnetic field, a two-state light beam to the first and second magnetic film, which two-state light beam is modulated in accordance with recorded data coded so as to provide FALSE states between two TRUE states, the light beam power of the two-state light beam being alternately at a high-level state and a low-level state as a result of modulation, so that the first and second magnetic films are heated to a temperature higher than the second temperature but lower than first temperature when the light beam power is at the low level, and so that the first and second magnetic films are heated to a temperature higher than the first temperature when the light beam power is at the high level, the magneto-optic recording method also including the steps of:

forming record marks such that FALSE states are recorded while the light beam power is controlled to be at a high level so as to heat the recording medium to a high temperature; and recording TRUE states while the light beam power is controlled to be at a low level so as to heat the recording medium to a low temperature.

According to the present invention, intervals between the record marks are maintained to be regular irrespective of the recorded data pattern, and the CN ratio is maintained regular irrespective of the recorded data pattern even when the high power level and the low power level of the light beam are fixed.

BRIEF DESCRIPTION OF THE DRAWINGS

FIGS. 2(A)–2(D) show examples of magneto-optic overwrite recording in which (2, 7) RLL coding is used;

FIGS. 10(A)–10(G) explains the operation of the apparatus of FIG. 9;

FIGS. 13(A)–(G) explains the operation of the apparatus of FIG. 12;

FIG. 15 shows a configuration of the magneto-optic recording method used in the fourth embodiment of the present invention; and FIGS. 16(A)–16(F) explain the operation of the apparatus of FIG. 15.

BEST MODE OF CARRYING OUT THE INVENTION

Figure 4:
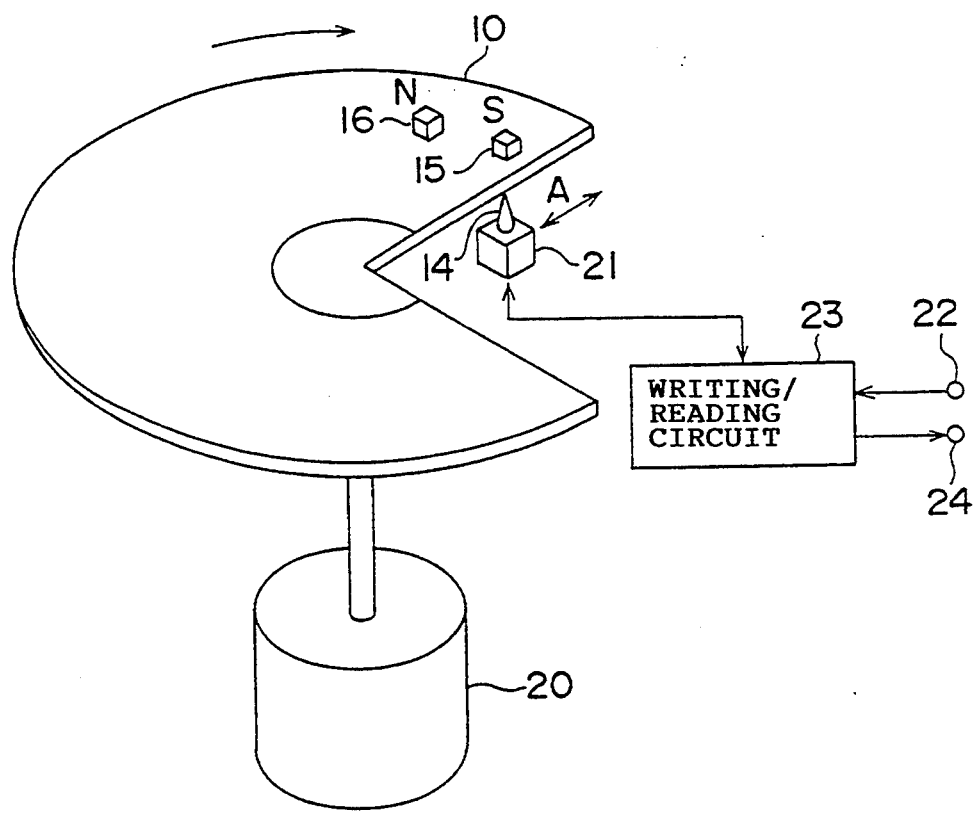
FIG. 4 shows a schematic configuration of a magneto-optic writing/reading apparatus to which a magneto-optic overwrite recording method according to the present invention is applied.

FIG. 4 shows a schematic configuration of a magneto-optic recording apparatus to which the present invention is applied.

Figure 1A:
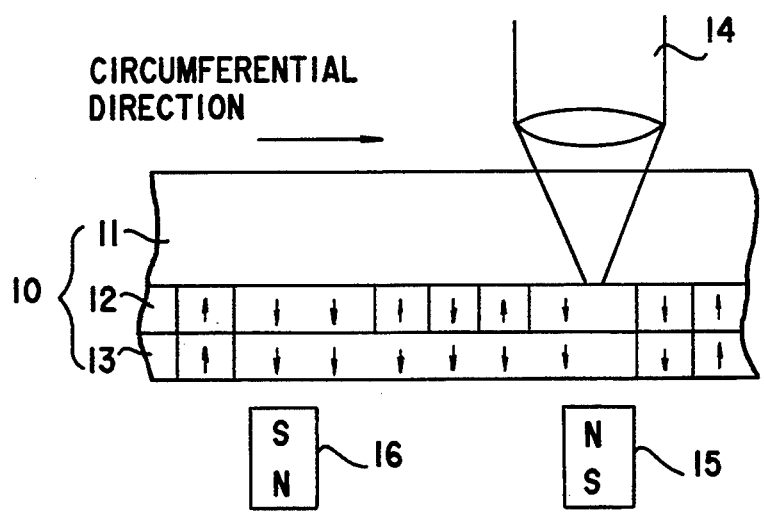
FIGS. 1(A) and 1(B) show the principle of a magneto-optic overwrite recording method.
Figure 1B:
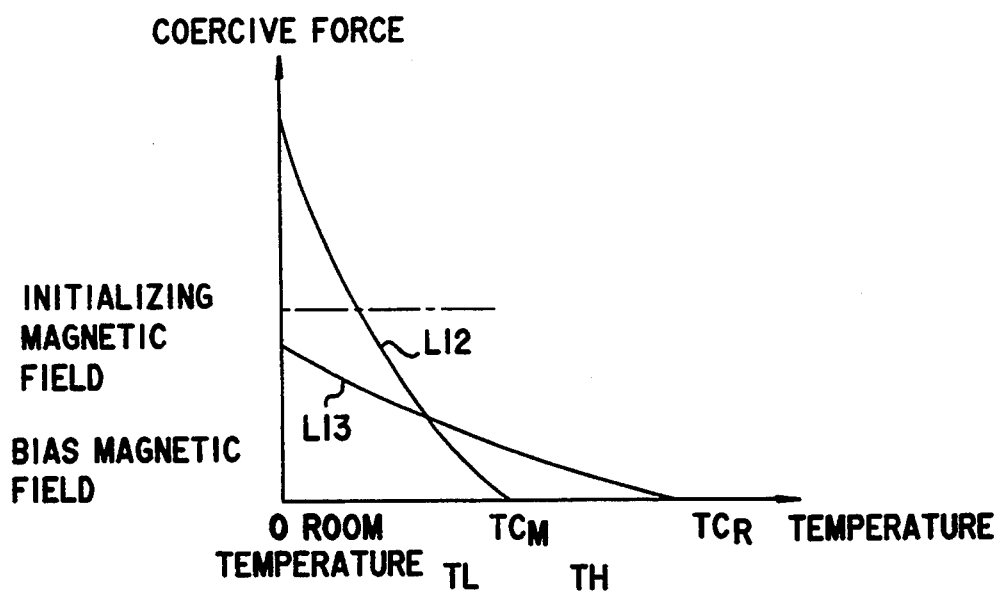

Referring to FIG. 4, a magneto-optic recording apparatus comprises the disk 10 having a configuration shown in FIG. 1(A). The disk 10 is made to rotate by means of a motor 20 at a predetermined speed, for example at a typical speed of several thousand rpm, in a direction indicated by an arrow. In an example shown in the figure, an optical head including a photodetector, a lens, a mirror and the like is provided below the disk 10. The beam 14 is applied to a main underside surface of the disk 10 so as to write thereto or read therefrom information signals. The disk 10 contains the memory layer 12 and the recording layer 13 on the main underside surface. The laser light beam 14 output from the optical head 21 is made to converge on the main underside surface by means of a lens provided at the end of a swingable arm (not shown) that is made to swing below the main underside surface of the disk 10. The bias magnet 15 and the initializing magnet 16 are provided above the disk 10 in such a manner that the magnet 15 is ahead of the magnet 16 in the direction in which the disk 10 is made to rotate. The magneto-optic recording apparatus also comprises a writing/reading circuit 23 for supplying electric drive signals to the optical head 21, the writing/reading circuit 23 converting write signals fed to an input terminal 22 thereof into (2, 7) RLL codes and supplying electric drive signals formed on the basis of a coding process to a laser diode provided in the optical head 21. When write signals are to be retrieved from the disk 10, the circuit 23 drives the laser diode provided in the optical head 21 so that the disk is irradiated with the laser beam power $P_R$, the photodetector provided in the optical head 21 detecting the light beam reflected by the main underside surface of the disk 10. The photodetector forms output electric signals corresponding to the detected light beam and supplies the same to the writing/reading circuit 23. The output electric signals output by the photodetector is also obtained by subjecting to (2, 7) RLL coding process the information recorded in the form of magnetization directions. The circuit 23 decodes the signals and supplies the same to an output terminal 24 thereof.

FIGS. 5(A)–5(D) show the magneto-optic recording method according to a first embodiment of the present invention, which method is applied to the apparatus of FIG. 4.

Figure 5:
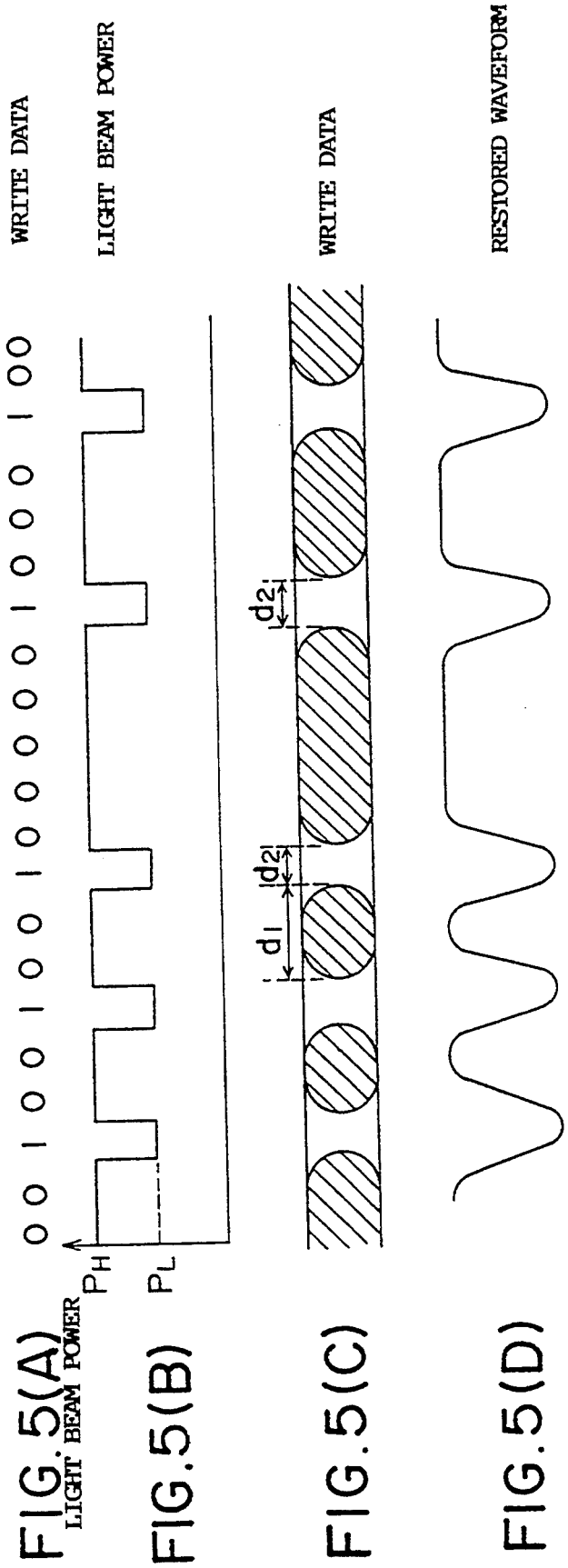
FIGS. 5(A)–5(D) show a magneto-optic recording method according to a first embodiment of the present invention.

FIG. 5(A) shows the (2, 7) RLL coded write signals supplied to the laser diode provided in the optical head 21, and FIG. 5(B) shows the corresponding output light beam power levels. As is evident from FIG. 5(B), the output light beam power level is set to the level $P_L$ to correspond to a TRUE state "1" of the recorded data, and the output light beam power level is set to the level $P_H$ to correspond to a FALSE state "0" of the recorded data. The relationship between the data and the light beam power level shown in FIGS. 5(A) and 5(B) is opposite the relationship shown in FIGS. 2(A) and 2(B).

FIG. 5(C) show magnetization patterns or record marks formed on the disk 10 in accordance with the output light beam power levels shown in FIG. 5(B). As in the case of FIG. 2(C), hatched areas of FIG. 5(C) indicate areas where reversals in magnetization have taken place. Since the data shown in FIG. 5(A) is (2, 7) RLL coded, there can be no occurrence of two successive TRUE states "1" at least two FALSE states "0" invariably intervening between the two TRUE states "1". Intervals $d_2$ between record marks shown in FIG. 5(C) are substantially regular, either after a 1.5τ pattern or after a 4τ pattern. The areas adjacent to the hatched marks undergo substantially the same influence from the propagation of the heat that produced those marks from area to area.

Figure 6:
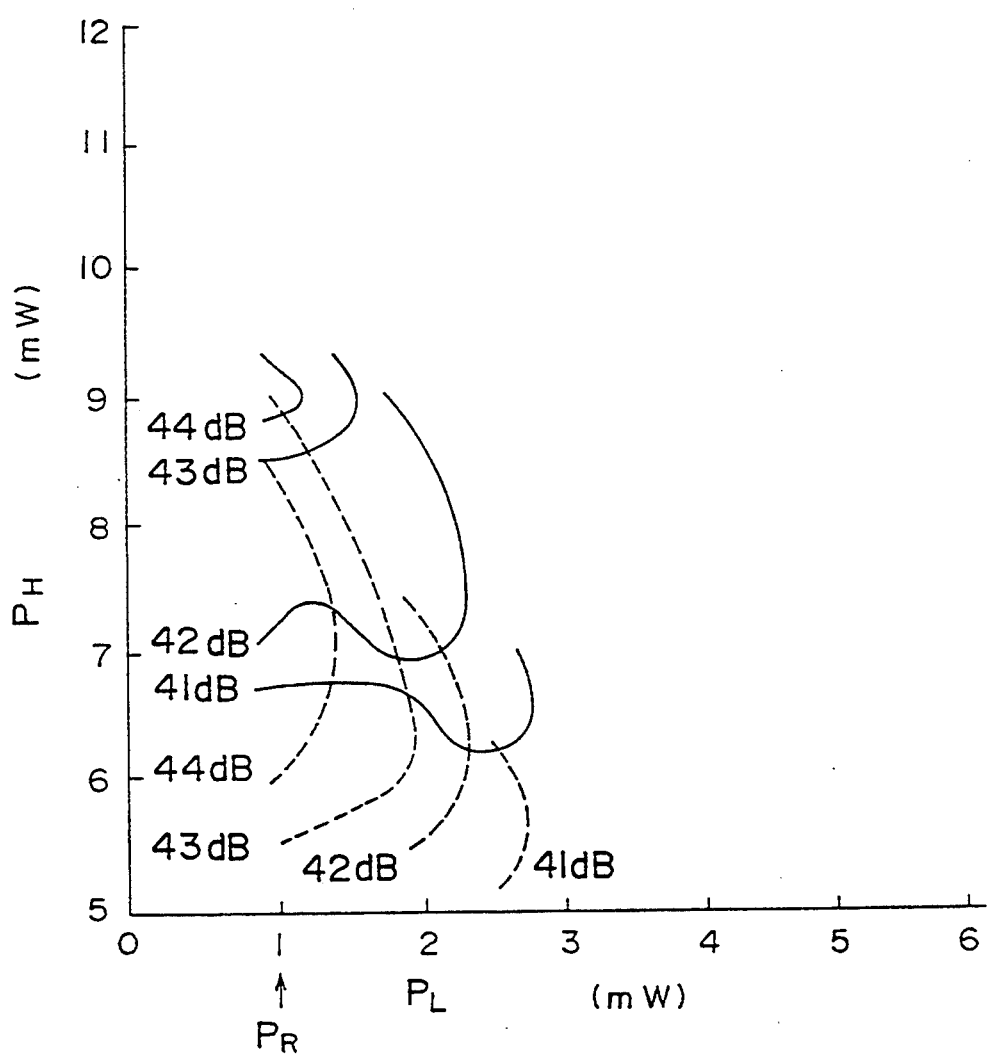
FIG. 6 shows a recording characteristic of the magneto-optic recording method according to the first embodiment of the present invention.

FIG. 6 is a graph obtained by plotting CN ratios exhibited when the recording method indicated by FIG. 5(B) is used, against various combinations of light beam powers.

Figure 3:
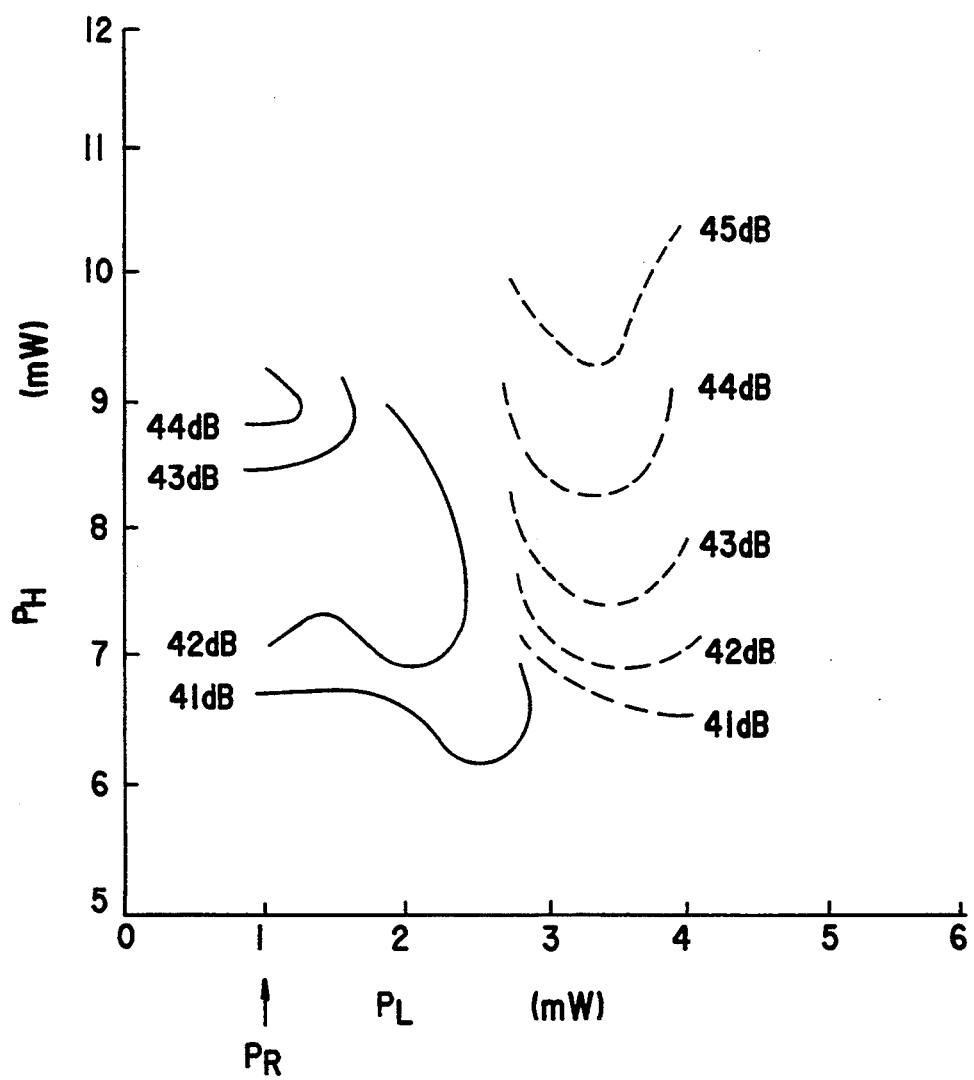
FIG. 3 shows a recording characteristic exhibited in a conventional magneto-optic overwrite recording.

Referring to FIG. 6, solid lines indicate, as in the case of FIG. 3, CN ratios corresponding to the 1.5τ pattern, and broken lines indicate CN ratios corresponding to the 4τ pattern. As can be seen from the graph, the use of the magneto-optic recording method of this embodiment ensures that the values of the light beam power $P_L$ associated with the best CN ratios are substantially the same both with the 1.5τ pattern and with the 4τ pattern. For example, by setting $P_L$ to 2 mW, a CN ratio of about 42 dB can be obtained both with the 1.5τ pattern and with the 4τ pattern. By setting $P_L$ to 1 mW, a CN ratio of 44 dB can be obtained with both patterns. The light beam power $P_L$ in the latter case is equal to the light beam power $P_R$ used in the read mode. $P_L$ can also be set to 0.

A description will now be given, with reference to FIGS. 7(A)–7(C), of a second embodiment of the present invention.

Although, in the first embodiment described above, the light beam power $P_L$ associated with the record marks can be set to a uniform value, the optimal value of the light beam power $P_R$ associated with the background areas between the record marks differ between the 1.5τ pattern and the 4τ pattern. This is presumably because of the fact that the recording method of the first embodiment shown in FIG. 5(A) is operated in a manner opposite that of the recording method shown in FIG. 2(A) and that an excessive heat deriving from a succession of $P_H$ power levels due to a succession of states "0" results in the $P_H$ level associated with a given C/N ratio being different from one pattern to the other. Accordingly, the object of the second embodiment of the present invention is to improve the first embodiment and to provide a magneto-optic overwrite recording method and apparatus in which optimal light beam powers $P_L$ and $P_H$ do not depend on the recorded pattern.

Figures 7A, 7B, 7C:
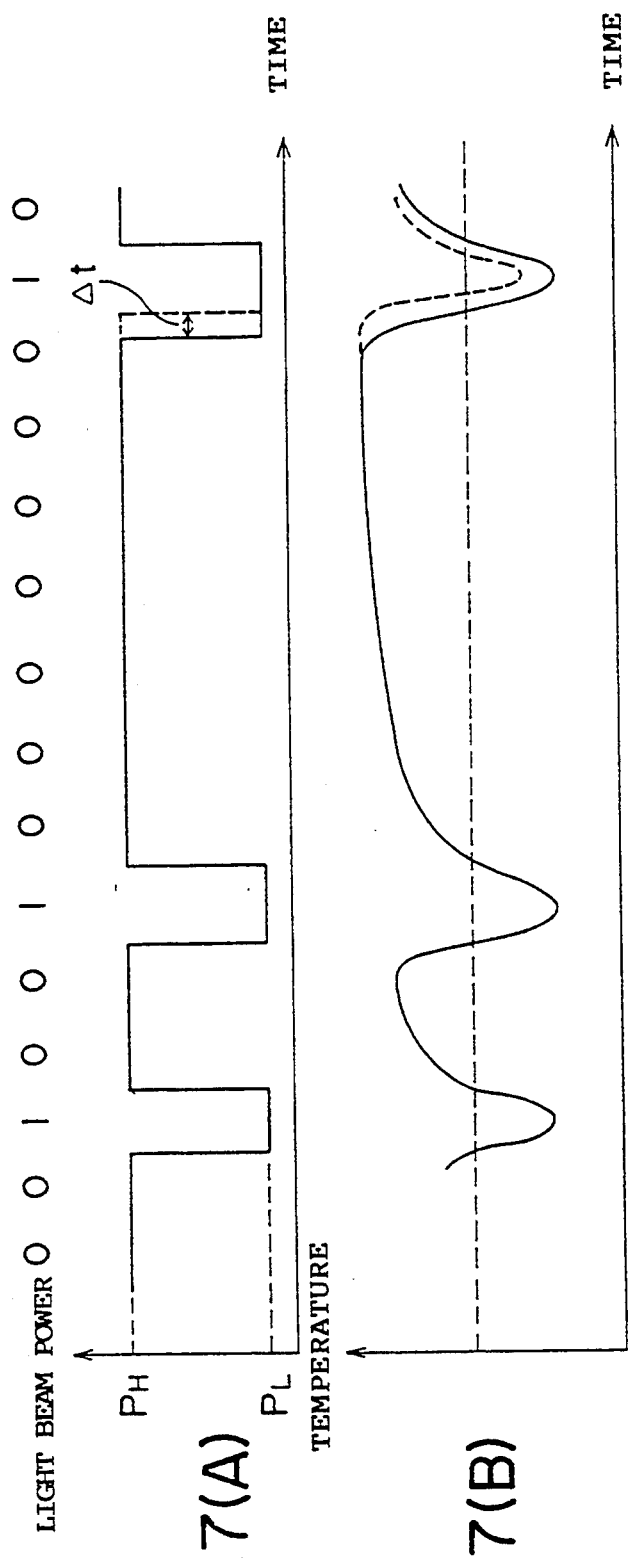
FIGS. 7(A)–7(C) show a magneto-optic recording method according to a second embodiment of the present invention.

FIG. 7(A) shows light beam pulses used in the recording method of the second embodiment of the present invention. FIG. 7(B) shows a variation with time in the temperature of the recording medium corresponding to such light beam pulses, the variation being shown as a function of time. Further, FIG. 7(C) shows record marks formed on the magneto-optic recording medium so as to correspond to the write light beam pulses of FIG. 7(A). Referring to FIG. 7(A), the write light signals are (2, 7) RLL coded. As in the first embodiment, the pulse "0" is associated with the light power level $P_H$, and the pulse "1" is associated with the light power level $P_L$.

Referring to FIG. 7(A), the timing of the pulse "1" is advanced by Δτ At the end of the 4τ pattern as compared to the case of the 1.5τ pattern. An excessive heat on the recording medium deriving from a succession of pulses "0" in the 4τ pattern is avoided. That is, as shown in FIG. 7(B), the cooling of the recording medium is advanced by advancing the switching of the high level to the low level by a time Δτ, that a delay, due to a succession of pulses "0" in the cooling of the recording medium is compensated for. As a result, hatched record marks shown in FIG. 7(C) have substantially the same size whether they are the 1.5τ pattern or the 4τ pattern, so that the sufficient CN ratios are maintained. That is, sizes a and b of record marks shown in FIG. 7(C) are maintained at regular values.

Figure 8A:
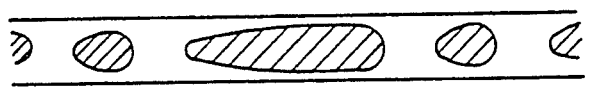
FIGS. 8(A)–8(C) show an effect achieved by the second embodiment.
Figure 8B:
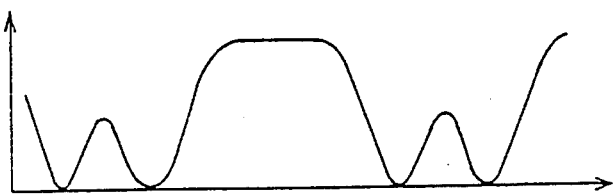
Figure 8C:
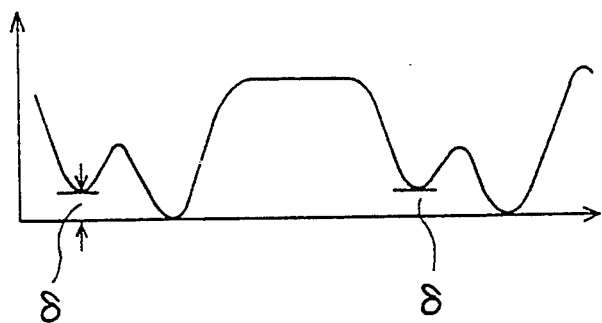

FIGS. 8(A)–8(C) compare restored waveforms obtained when signals recorded in accordance with the second embodiment are retrieved with the restored waveform obtained in the first embodiment. FIG. 8(A) shows the pattern recorded on the magneto-optic disk, FIG. 8(B) shows the restored waveform in the second embodiment, and FIG. 8(C) shows the restored waveform in the first embodiment. It is found, in comparing FIG. 8(B) with FIG. 8(C), that, in FIG. 8(C), the level of the retrieved signal corresponding to the write pulse "1" is displaced by δ (an unspecified amount which depends on the recorded pattern) from the proper level, whereas the retrieved signal shown in FIG. 8(B), which signal is obtained according to this embodiment, is free from such a displacement in the signal level. This indicates that intervals a and b of the record marks are maintained regular irrespective of the recorded pattern. Generally, Δτ is substantially proportional to the number of successive states "0" in the recorded pattern and can be expressed as $\Delta\tau \div A \cdot \tau$, where the constant A varies according to the configuration and rotation speed of the disk. In the example shown, an optimal effect was experimentally achieved when $\Delta\tau$ was 10 msec. The value of $\Delta\tau$ can be determined by writing and retrieving several typical recorded patterns on the magneto-optic disk.

Figure 9:
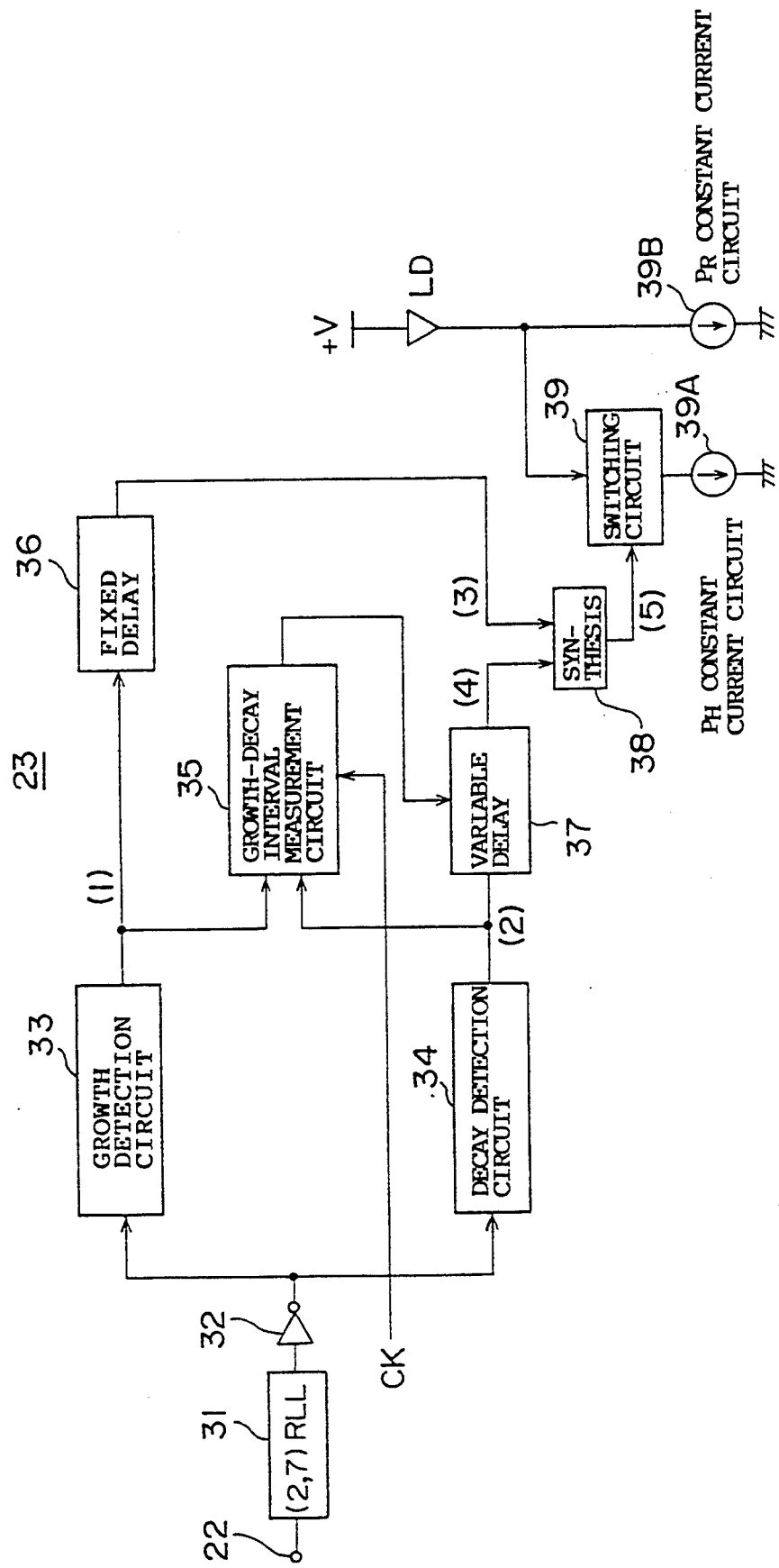
FIG. 9 shows a configuration of a magneto-optic recording apparatus used in the second embodiment of the present invention.

FIG. 9 shows the configuration of the writing/reading circuit 23 for implementing the second embodiment.

Referring to FIG. 9, the circuit 23 comprises: a known coding circuit 31 for subjecting to (2, 7) RLL coding input signals fed to the input terminal 22 thereof; and an inverter 32 for reversing the logical values of the coded output signal formed by means of the circuit 31. The inverter 32 forms a coded output signal as shown in FIG. 5(A) or in FIG. 10(A). While, in the first embodiment, the output signal from the inverter 32 is directly supplied to the optical head 21 to produce the output light power levels shown in FIG. 5(B), the output signal from the inverter 32 is supplied to a growth detection circuit 33 and a decay detection circuit 34.

The growth detection circuit 33 detects the growth of the pulse signal shown in FIG. 10(A) and output from the inverter 32, and the decay detection circuit 34 detects the decay thereof. The circuit 33, upon detecting the growth of the input signal pulse, forms a corresponding trigger signal (1) as shown in FIG. 10(C) and supplies this trigger signal (1) to a growth—decay measuring circuit 35. Similarly, the circuit 34, upon detecting the decay of the input pulse signal, forms a trigger signal (2) as shown in FIG. 10(D) and supplies this trigger signal to the circuit 35. The circuit 35 is also fed an input of a clock signal CK, measures a time that elapses from the growth of the input pulse till the decay thereof, and outputs a control signal indicating the measurement result. In other words, the measuring circuit 35 measures a time T that elapses since the moment a pulse of FIG. 10(C) appears till the moment a pulse of FIG. 10(D) appears subsequently.

The output signal (1) from the growth detection circuit 33 is supplied to the measuring circuit 35 and also to a fixed delay circuit 36. The circuit 26 delays the signal (1) by a predetermined delay time $\tau_1$, as shown in FIG. 10(E), so as to form a signal (3). The delay time $\tau_1$ is constant. The output signal (2) of the decay detection circuit 34 is supplied to the circuit 35 and also to a variable delay circuit 37. The variable delay circuit 37 forms a signal (4) obtained by delaying the signal (2) as shown in FIG. 10(F) in accordance with the output control signal from the measuring circuit 35. That is, the circuit 37 delays the input signal pulse (2) in accordance with the time T that elapses from the moment a pulse of FIG. 10(C) appears till the moment a pulse of FIG. (D) appears subsequently, the delaying amount being controlled to be reduced when the time T is relatively long.

The signals (3) and (4) thus formed are supplied to a drive signal synthesizing circuit 38. The circuit 38 forms, in accordance with an interval INT between the pulse (4) and the pulse (3), a drive pulse (5) for driving the laser diode LD provided in the optical head 21 and supplies the drive pulse (5) to a switching circuit 39. The switching circuit 39, upon being fed the drive pulse (5), activates a current source 39A for driving the laser diode LD at the output light power level $P_H$. In the example shown, the laser diode is also driven by a current source 39B for supplying a drive current corresponding to the light power level $P_R$. In the latter case, the laser diode LD is driven by the light power level $P_R$ corresponding to the light power level $P_L$.

In the configuration of FIG. 9, the timing at which the leading edge of the drive pulse (5) appears can be varied in accordance with the recorded pattern, by varying, with respect to the pulse (3), the timing of the pulse (4) in accordance with the recorded pattern. For example, the timing of the decay of drive pulse (5) in the $4\tau$ pattern is advanced by $\Delta\tau$ with respect to that in the $1.5\tau$ pattern. As a result, the effects shown in FIGS. 7(A)–7(C), and in FIGS. 8(A) and 8(B) can be obtained.

A description will now be given, with reference to FIGS. 11(A)–11(C), of a third embodiment of the present invention.

Figure 11A:
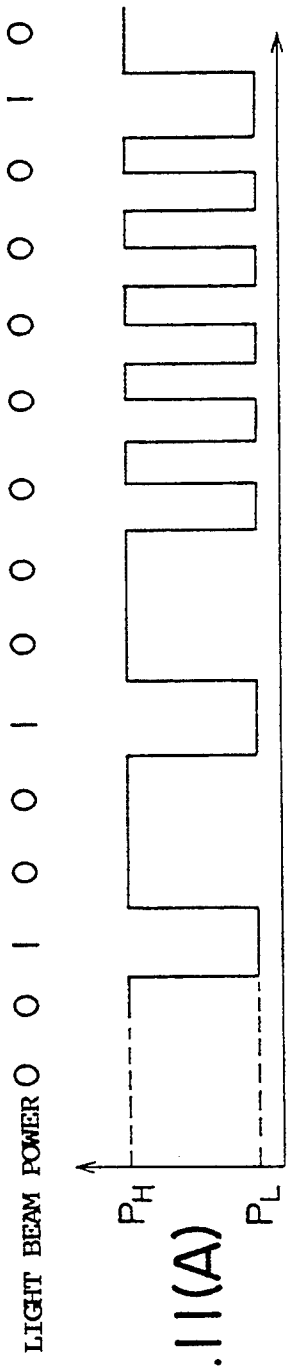
FIGS. 11 (A)–11 (C) shows a magneto-optic recording method according to a third embodiment of the present invention.

FIG. 11(A) shows an example of write pulses in this embodiment. The illustrated example corresponds to the examples of FIGS. 7(A) and 10(A), and includes a $1.5\tau$ pattern and a $4\tau$ pattern. In this embodiment, the state "0" is associated with a pulse having a 50% duty ratio when there is a succession of FALSE states "0" in the 4 pattern. This way, an excessive rise in the temperature of the recording medium can be avoided, as shown in FIG. 11(B), even when a high light beam power $P_H$ is to be maintained. As shown in FIG. 11(C), it is possible to obtain a record mark followed by the length b in the $4\tau$ pattern, which length is substantially identical to the length b after the $1.5\tau$ pattern. Broken lines in FIG. 11(B) and 11(C) correspond to the first embodiment. Results similar to those shown in FIG. 8(B) can be obtained in this embodiment.

Figure 11B:
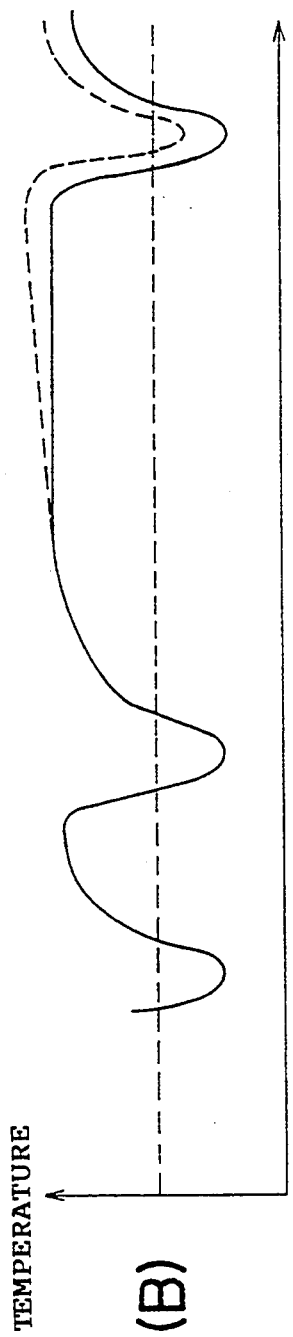
Figure 11C:
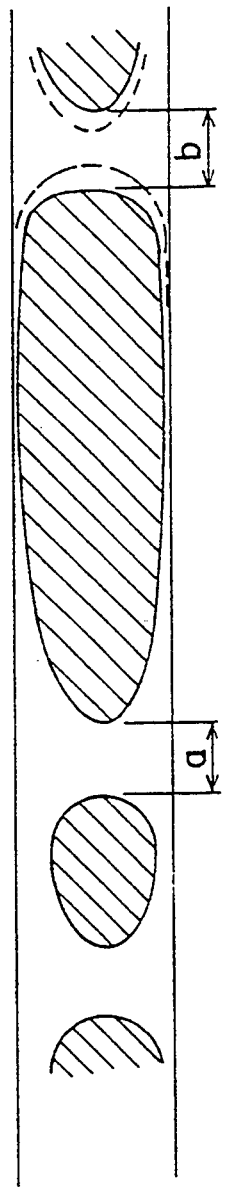
Figure 12:
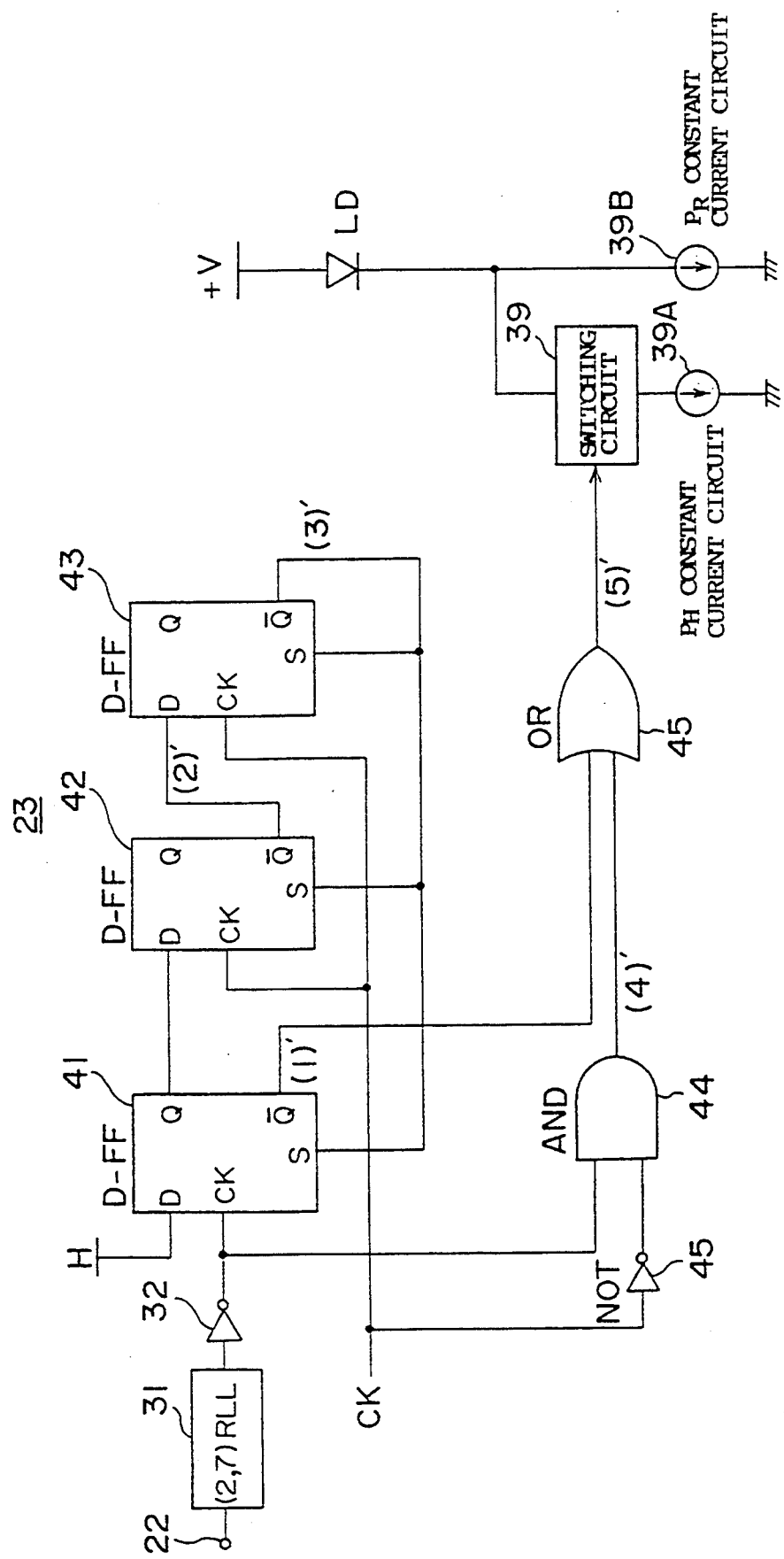
FIGS. 12 shows a configuration of a magneto-optic recording apparatus according to a third embodiment of the present invention.

FIG. 12 shows the configuration of the writing/reading circuit 23 for effecting the control shown in FIGS. 11(A)–11(C).

Referring to FIG. 12, the circuit 23 includes the (2, 7) RLL coding circuit 31 and the inverter 32 for inverting the logical values of the output of the circuit 31. The circuit 23 also includes D-type flip-flops 41–43 in a cascade connection. A data input terminal D of the flip-flop 41 is maintained at a predetermined high logical level H, and an output signal from the inverter 32 is applied to a clock input terminal thereof. A Q output terminal of the flip-flop 41 is connected to a data input terminal D of the flip-flop 42; and a clock is applied to a clock terminal CK of the flip-flop 42. A /Q output signal (2') of the flip-flop 42 is applied to a data input terminal D of the flip-flop 43; a /Q output signal (3') of the flip-flop 42 is returned to set input terminals S of the flip-flops 41–43. A clock is applied to a clock input terminal CK of the flip-flop 43, as in the case of the flip-flop 42.

The output of the inverter 32 is fed to an input terminal of an AND gate 44, and a clock is fed to the other input terminal of the AND gate 44 via an inverter 45. An output signal (4') of the AND gate 44 is fed to an input terminal of an OR gate 25, and an output signal (1') from the /Q output terminal of the flip-flop 41 is fed to the other input terminal of the OR gate 25. The OR gate applies an output signal (5') thereof to the switching circuit 39 and drives the same.

FIGS. 13(A) and 13(B) show examples of (2, 7) RLL coded signals and clock signals, respectively, supplied to the input terminal 22 in this embodiment, the codes and signals being similar to those shown in FIGS. 10(A) and (B). FIG. 13(C) shows a waveform of the /Q output signal (1') output from the flip-flop 41. FIG. 13(D) shows a waveform of the /Q output signal from the flip-flop 42. FIG. 13(E) shows a waveform of the /Q output signal from the flip-flop 43. As can be seen from FIG. 13(C), since the input signal fed to the data input terminal D of the flip-flop 41 is at a high-voltage level, the flip-flop 41 latches the /Q output signal at a high level upon detecting the leading edge of the input signal pulse shown in FIG,13(A) and fed to the clock input terminal. The flip-flop 41 releases the /Q output signal from being latched upon the input of the input signal (3') to the set input terminal. As a result, a waveform shown in FIG. 13(C) is obtained. It is found, from the waveform of FIG. 13(C), that, when the laser diode LD is to be driven on a continuous basis to adapt to the 4τ pattern, for example, the /Q output signal is maintained at a low level after a time corresponding to a 1.5τ pattern, that is a minimum pattern, has elapsed. The data input terminal D of the flip-flop 42 is fed a signal obtained by inverting logical values of the signal (1'). The flip-flop 42 latches the /Q output signal upon detecting the growth of the clock pulse. This signal /Q is released from being latched when the signal (3') is input to the flip-flop 42. A waveform of the signal (2') is obtained as shown in FIG. 13(D). The flip-flop 43 is fed the signal (2') at its data input terminal D and latches the /Q signal upon the growth of the clock pulse. This latch is released upon the detection of the falling edge of the signal (2'), so that a reset pulse (3') shown in FIG. 13(E) is obtained. The AND gate 44 performs an AND function on the Signal obtained by inverting logical values of the clock pulse and on the output data signal from the inverter 32, so that the signal (4') having a waveform shown in FIG. 13(F) is formed, the signal (4') being fed to the OR gate 45. In other words, the AND gate 44 allows the signal obtained by inverting logical values of the clock pulse shown in FIG. 13(B) to pass therethrough only when the write signal shown in FIG. 13(A) is maintained at a high level. Since the OR gate 45 is fed the /Q output signal of the flip-flop 41, the output signal from the OR gate 45 as shown in FIG. 13(G) is fed to the switching circuit 39, so that magneto-optic recording as explained in FIGS. 11(A)–11(C) is performed. In the 1.5τ pattern, the high level of the clock pulse shown in FIG. 13(F) and the high level of the write data shown in FIG. 13(A) concurs, with the result that the data as shown in FIG. 13(A) is output. On the other hand, in the patterns lasting longer than the 1.5τ pattern, for example, in the 4τ pattern, the clock pulse shown in FIG. 13(F) is output because the output signal (1') from the flip-flop 41 drops to a low level after a time corresponding to the 1.5τ pattern has elapsed.

Figure 14A:
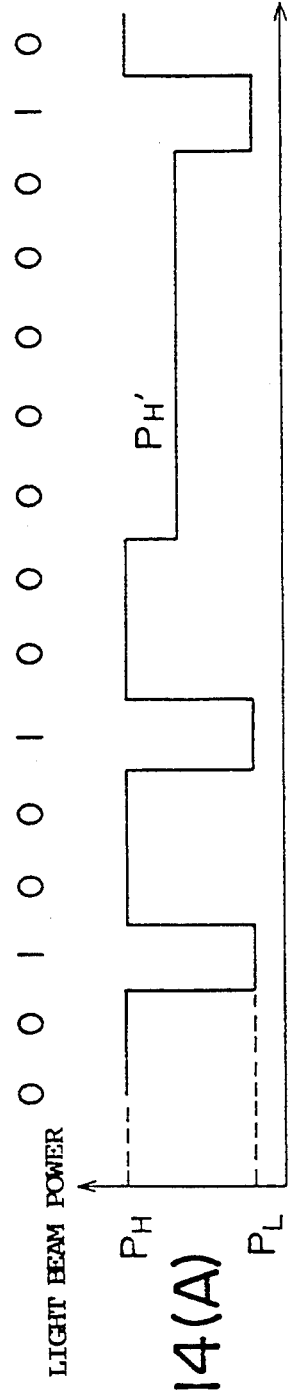
FIGS. 14(A)–(C) show a magneto-optic recording method according to a fourth embodiment of the present invention.
Figure 14B:
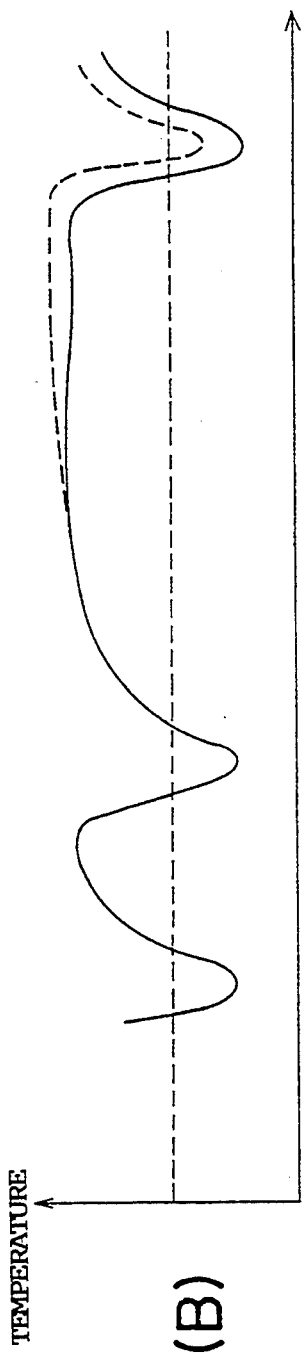
Figure 14C:
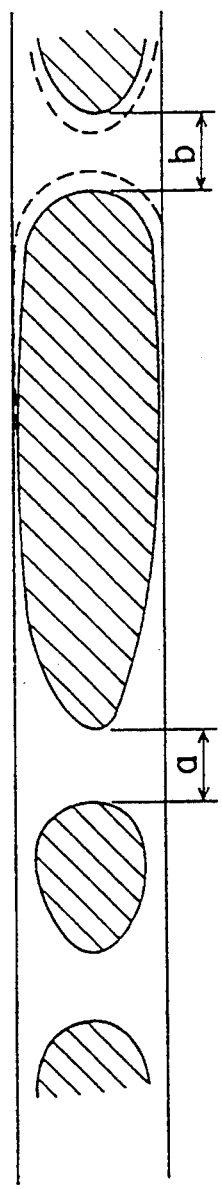

A description will now be given, with reference to FIGS. 14(A)–14(C), of a fourth embodiment of the present invention. FIG. 14(A) shows a waveform of a drive pulse for driving the laser diode provided in the optical head 12; FIG. 14(B) shows a variation in temperature, which variation takes place in the optical disk in accordance with a waveform of the drive pulse of FIG. 14(A), and FIG. 14(C) shows record marks recorded on the optical disk.

In this embodiment, the magnitude of the drive pulse is somewhat reduced when the state "0" is repeated in the write data, so that a light power $P_H'$, instead of the light power $P_H$ is used ($P_L < P_H' < P_H$). As a result, an excessive rise in the temperature of the recording medium is avoided as shown in FIG. 13(B), and the problem arising from the displacement of record marks is resolved, as shown in FIG. 14(C). It is obvious from FIG. 14(C) that this embodiment also ensures that the record mark intervals a and b are made substantially regular.

FIG. 15 shows the configuration of the writing/reading circuit 23 for forming a drive pulse shown in FIG. 14(A).

Referring to FIG. 15, the circuit 23 includes the flip-flops 41–43 interconnected in the same way as shown in FIG. 12. Signals (1'), (2') and (3') having the timings as shown in FIGS. 16(A)–16(E) are formed. FIGS. 16(A)–16(E) are identical to FIGS. 13(A)–13(E). In this embodiment, the output signal (1') from the flip-flop 41 directly drives the switching circuit 39, the output signal (1') having a high logical value in response to the detection of the 1.5τ pattern in the write signal. As a result, the laser diode LD provided in the optical head 21 is driven to produce the high light power $P_H$ when the write signal includes 1.5τ patterns.

When the recorded pattern has a long duration, as in the case of the 4τ pattern, the output signal (1') drops to a low level when the period corresponding to the 1.5τ pattern has expired, and the laser diode ceased to be driven to produce the power $P_H$. In this case, an EX-OR circuit 44 being fed the signal (1') at an input terminal thereof and fed a coded input signal shown in FIG. 16(A) at the other input terminal forms the output signal (4)" as shown in FIG. 16(F), at a timing subsequent to the 1.5τ pattern. The output signal (4') activates a constant current source 40A for driving the laser diode LD to produce $P_H$. The laser diode LD is driven by a drive current pulse as shown in FIG. 14(A). As a result, the position and the size of the record marks can be maintained to be regular irrespective of the recorded pattern, as shown in FIG. 14(C).

The present invention is not limited to the above described embodiments, and variations and modifications may be made.

INDUSTRIAL APPLICATION

According to the present invention, it is possible, with a magneto-optic recording apparatus, to form record marks at proper positions on the recording medium irrespective of the recorded pattern, the record marks being formed as a result of heating the recording medium by means of a laser beam. Thus, the CN ratio of the magneto-optic recording can be significantly improved.

We claim:

1. A magneto-optic recording method wherein information is recorded on a magneto-optic recording medium comprising: a first magnetic film having a first coercive force—temperature characteristic characterized by a first Curie point; a second magnetic film coupled by exchange interaction with said first magnetic film and having a second coercive force—temperature characteristic characterized by a second Curie point lower than said first Curie point, said magneto-optic recording method comprising the steps of:

aligning, by applying a first external magnetic field having a first direction and adjusted to a magnitude controlled to be large enough to align magnetization direction of said first magnetic film with said first direction at a room temperature but not large enough to align magnetization direction of said second magnetic film with said first direction at a room temperature, magnetization direction of said first magnetic film with said first direction;

applying, after the step of applying said first external magnetic field, a second magnetic field in a second direction opposed to said first direction at a second magnitude controlled such that said first magnetic film is magnetized in said second direction at a first temperature and such that said second magnetic film is magnetized in said second direction at a second temperature lower than said first temperature; and directing, at the same time as the step of applying said second magnetic field, a two-state light beam to said first and second magnetic film, which two-state light beam is modulated in accordance with write data coded so as to provide FALSE states between two TRUE states, the light beam power of the two-state light beam being alternately at a high-level state and a low-level state as a result of modulation, so that said first and second magnetic films are heated to a temperature higher than said second temperature but lower than first temperature when the light beam power is at said low level, and so that said first and second magnetic films are heated to a temperature higher than said first temperature when the light beam power is at said high level, said magneto-optic recording method also including the steps of:

forming record marks such that FALSE states are recorded while the light beam power is controlled to be at said high-level state so as to heat the recording medium to a high temperature; and recording TRUE states while the light beam power is controlled to be at said low-level state so as to heat the recording medium to a low temperature.

2. The method as claimed in claim 1, wherein said light beam has, in said low-level state, substantially the same light beam power as the light beam applied in a reading mode.

3. The method as claimed in claim 1, wherein said light beam power is set to be substantially zero in said low-level state.

4. The method as claimed in claim 1, further including the steps of:

measuring a duration of said high-level state of said light beam; and correcting, when said FALSE state in said write data is followed by said TRUE state, duration of said high-level state of said light beam by a predetermined correction amount so that said duration becomes shorter, wherein said predetermined correction amount is increased as the duration for which said light beam is to be maintained at said high-level state increases.

5. The method as claimed in claim 4, wherein said correcting step advances the timing at which said FALSE state is followed by said TRUE state in the write data, in accordance with said correction amount.

6. The method as claimed in claim 1, wherein said light beam power is alternately varied, when the duration of said high-level state of said write data exceeds a minimum write data length, in accordance with a predetermined clock having a shorter period than said minimum write data length.

7. The method as claimed in claim 6, wherein said light beam is alternately varied from said high-level state to a said low-level state and vice versa.

8. The method as claimed in claim 7, including a step of dropping said light beam power from said high-level state to an intermediate level between said high-level state and said low-level state.

9. A magneto-optic recording apparatus comprising:

supporting means adapted for supporting a magneto-optic recording medium having: a first magnetic film having a first coercive force—temperature characteristic characterized by a first Curie point; a second magnetic film coupled by exchange interaction with said first magnetic film and having a second coercive force—temperature characteristic characterized by a second Curie point lower than said first Curie point; and magneto-optic recording means which, upon being fed a drive signal pulse, carries out magneto-optic recording by applying a light beam to said magneto-optic recording medium, a power of said light beam being varied between a low-level state and a high-level state in accordance with said drive signal pulse; and a recording circuit which, upon being fed a write signal, codes said signal with pulses and delays to form said drive signal pulse, said recording circuit including: growth detection means for detecting the growth of said drive signal pulse; decay detection means for detecting the decay of said drive signal pulse; correction means for advancing the timing of said decay by a predetermined correction amount in accordance with a time that elapses from the growth of said drive signal until the immediately following decay thereof, said correcting means increases said correction amount as the time from said growth until said decay increases.

10. A magneto-optic recording apparatus comprising:

supporting means adapted for supporting a magneto-optic recording medium having: a first magnetic film having a first coercive force—temperature characteristic characterized by a first Curie point; a second magnetic film coupled by exchange interaction with said first magnetic film and having a second coercive force—temperature characteristic characterized by a second Curie point lower than said first Curie point; and magneto-optic recording means which, upon being fed a drive signal pulse, carries out magneto-optic recording by applying light beam to said magneto-optic recording medium, a power of said light beam being varied between a low-level state and a high-level state in accordance with said drive signal pulse; and a recording circuit which, upon being fed a write signal, codes said write signal with pulses and delays to form said drive signal pulse, said recording circuit including switching means which, being fed a clock pulse, switches said light beam power in an alternate manner between said high-level state and said low-level state in accordance with said clock pulse, when the high-level state of said drive signal pulse is to be maintained beyond a predetermined write data length.

11. A magneto-optic recording apparatus comprising:

supporting means adapted for supporting a magneto-optic recording medium having: a first magnetic film having a first coercive force—temperature characteristic characterized by a first Curie point; a second magnetic film coupled by exchange interaction with said first magnetic film and having a second coercive force—temperature characteristic characterized by a second Curie point lower than said first Curie point; and magneto-optic recording means which, upon being fed a drive signal pulse, carries out magneto-optic recording by applying light beam to said magneto-optic recording medium, a power of said light beam being varied between a low-level state and high-level state in accordance with said drive signal pulse; and a recording circuit which, upon being fed a write signal, codes said write signal with pulses and delays to form said drive signal pulse, said recording circuit including switching means which, being fed a clock pulse, drops said light beam power to an intermediate level between said high-level state and said low-level state in accordance with said clock pulse, when the high-level state of said drive signal pulse is to be maintained beyond a predetermined write data length.

* * * * *